PLURAL MOTOR SYSTEM FOR POSITION SYNCHRONIZATION

Filed Aug. 12, 1960 5 Sheets-Sheet 1

JOHN H. WALLACE
PATRICK J. COLLERAN
INVENTORS

BY Flam and Flam
ATTORNEYS.

SINGLE UNCONTROLLED-RATE DROP BACK

SINGLE FIXED-RATED DROP BACK (REACTOR)

SINGLE FIXED-RATE DROP BACK (MULTI MOTOR)

DUAL FIXED RATE DROP BACK (REACTOR)

JOHN H. WALLACE
PATRICK J. COLLERAN
INVENTORS.

BY Flam and Flam
ATTORNEYS.

DUAL FIXED-RATE DROP BACK (MULTI-MOTOR)

SINGLE FIXED-RATE SPEED UP (MULTI-MOTOR)

DUAL FIXED-RATE SPEED UP (MULTI-MOTOR)

COMBINATION SPEED UP AND DROP BACK (MULTI-MOTOR AND REACTOR)

JOHN H. WALLACE
PATRICK J. COLLERAN
INVENTORS.

BY Flam and Flam
ATTORNEYS.

PLURAL MOTOR SYSTEM FOR POSITION SYNCHRONIZATION

Filed Aug. 12, 1960 5 Sheets-Sheet 4

JOHN H. WALLACE
PATRICK J. COLLERAN
INVENTORS.

BY Flam and Flam
ATTORNEYS

JOHN H. WALLACE
PATRICK J. COLLERAN
INVENTORS.

BY Flam and Flam
ATTORNEYS.

United States Patent Office 3,149,273
Patented Sept. 15, 1964

3,149,273
PLURAL MOTOR SYSTEM FOR POSITION SYNCHRONIZATION

John H. Wallace, West Haven, and Patrick J. Colleran, North Haven, Conn., assignors, by mesne assignments, to Emerson Electric Co., a corporation of Missouri Filed Aug. 12, 1960, Ser. No. 49,345
13 Claims. (Cl. 318—70)

This invention relates to a system for controlling the movement of two devices or loads, such as conveyor belts or chains, or angularly movable work carriers or the like. While the system is especially applicable for causing the motion of both devices to keep exactly in step, other forms of moving devices requiring such position synchronization can be effectively controlled by this system.

One adaptation, by way of example, is for conveyor belt assembly lines in automobile manufacturing plants. In such plants it is common to use a pair of conveyors respectively carrying parts to be assembled. For example, one conveyor may carry a supply of body parts, and another conveyor adjacent the first may carry at least a supply of partly completed chassis. A body part and a chassis must reach the point of assembly so that the body part can be dropped on the chassis in correct alignment. Even a slight deviation from such position synchronization would cause undesired additional manipulation of the parts being carried by one or the other conveyor. This requirement means in effect that uniformly placed points of the two belts must pass a station in coincident relation.

Other situations where such position synchronization is necessary occur in connection wthe glassware manufacture, or in bottling or canning machinery.

It is one of the objects of this invention to provide a simple and effective electric drive system capable of effecting synchronism upon starting and of keeping two machines position synchronized.

It is another object of this invention to make it possible to maintain such position synchronization within a wide range of speeds.

An effective drive for such machines comprises synchronous alternating current motors fed from a common source. To adjust the speed, the frequency of the source is altered, as by adjusting the speed of the alternator that generates the electric power. The alternator may conveniently be driven by an induction motor coupled to the alternator through a vairable ratio transmission mechanism. In this way, the synchronous speeds of the machines may be adjusted to fit the requirements; for example, a slower speed may be desirable for the setting-up period.

It is another object of this invention to make it possible to bring the machines under any speed requirements to position synchronization.

It is another object of this invention to provide control apparatus that responds automatically when an excessive deviation is present between the two machines; for example, in the case of conveyors, it is possible to correct position synchronization substantially completely whenever they are out of step by only a small distance, such as an inch or so.

This correction may be effected by manual adjustments of the electromotive forces applied to one or both of the synchronous motors; for example, by speeding up or slowing one of the motors until selected spaced points of the two conveyors are in coincident positions. In some installations, it is necessary to stop one machine entirely.

It is another object of this invention to provide automatic controls delaying the correcting function until both synchronous motors are operating at substantially full synchronous speeds.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic representation of a pair of loads arranged to be kept in position synchronization;

FIGS. 2 to 9, inclusive, are diagrammatic representations of systems illustrating alternative means for attaining and maintaining position synchronism within tolerable limits;

Figure 1:
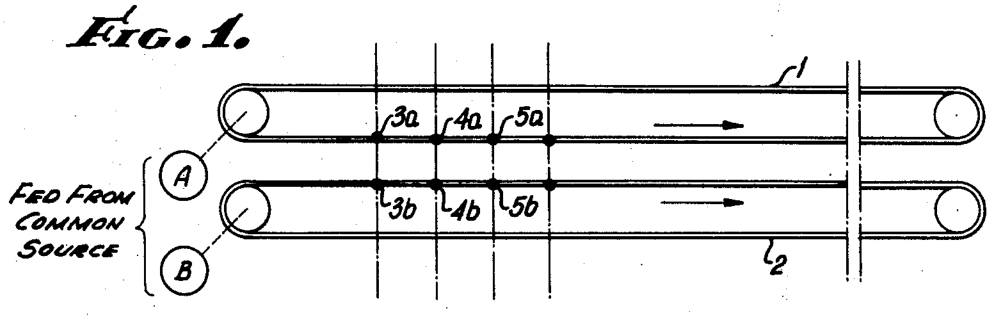

In FIG. 1, a pair of loads 1 and 2 are illustrated. Each of these loads is arranged to be moved continuously by the aid of the electrically driven motors A and B respectively fed from a common source of electrical energy. These motors are synchronous motors. Motor A may be considered a "slave" motor.

Although diagrammatically, conveyor belts or conveyors generally are indicated by the loads 1 and 2, they may take any variety of forms. For example, load 1 may be intended to carry body parts in an automobile assembly plant, while load 2 may be provided for carrying chassis upon which the automobile body parts are to be assembled by an assembler located at a definite state. Obviously uniformly spaced points, such as 3*a*, 4*a*, 5*a*, etc., of the moving load 1 must correspond substantially exactly with points 3*b*, 4*b*, 5*b*, etc.

Position synchronization, however, may be effected so long as a point, such as 3*a*, is brought into registry with any of the points 3*b*, 4*b*, 5*b*, etc. For then the pattern of exact registry between two series of spaced points is nevertheless effected.

Once having brought the two loads 1 and 2 into position synchronism, they tend to remain in such a position since the motors A and B are fed from a common source, and being of a synchronous nature, normally operate in position synchronization. However, heavier burdens upon one or the other of the loads 1 and 2 may cause a slight deviation from substantially exact synchronism. This is most apt to happen right after the system is started from standstill.

In order to correct this, means are provided for temporarily altering the rate of movement of one or the other or both of the loads 1 and 2 until points on the belt attain position synchronism. In this process of correction, it is essential only that a point such as 3*a* be aligned wtih any one of the points 3*b*, 4*b*, 5*b*, etc. Thus, in normal operation, let us assume that point *4a* advances toward the right ahead of point *4b*. Correction may occur by temporarily speeding up the conveyor 2 until the point *4b* catches up with point *4a*. On the other hand, correction may occur by slowing down the conveyor belt 2 until the point *5b* registers with point *4a*. The correction may also be similarly effected by either speeding up or slowing down the conveyor 1.

The moving loads 1 and 2 may be operated at any desired speed by varying the speed (and consequently the frequency) of the alternator supplying the motors A and B.

Ordinarily the correction for position synchronizing occurs when initiating the operation of the moving loads 1 and 2. Thus, the two motors A and B may not come up to synchronism together, and the system makes it possible to lock the two machines A and B into synchronism after they have been brought up to speed. Nevertheless, under unusual circumstances, deviation errors may occur, and correction is provided by the system.

Figure 2:
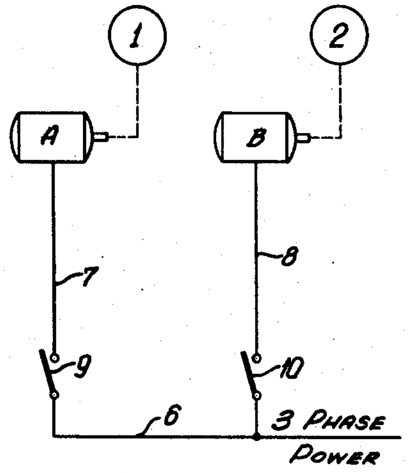

In the diagram of FIG. 2, the synchronous motors A and B are indicated as driving the loads 1 and 2. They are fed from a common source of three-phase power, as indicated by the connections 6, 7 and 8. Supply of power to the motor A is supplied by a switch or circuit controller 9. A similar switch 10 controls the supply of power to motor B.

When starting, both the switches 9 and 10 are closed, and the units brought up to synchronous speed. If position synchronization is effected, no further action takes place. If there is a deviation from position synchronization, the switch 9 associated with motor A is operated either to deenergize the motor windings or open the circuit in one leg of the three-phase motor A. In this way the motor A is caused to operate as a single-phase motor, and hence with less torque. The load 1, being driven by motor A, is slowed down in speed until its position synchronized point drops back to the next point of synchronization. Thereafter, both loads 1 and 2 operate in position synchronism.

Figure 3:
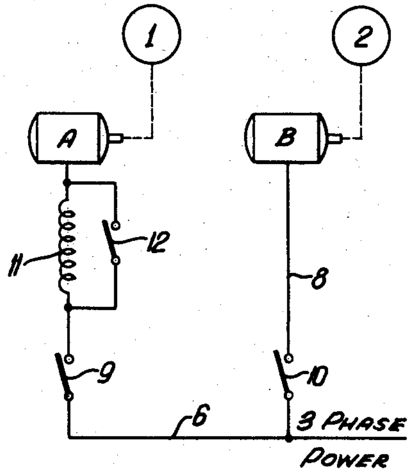

In the form of the system illustrated in FIG. 3, the speed of the slave motor A may be temporarily reduced by opening a short circuit around a reactor or reactors 11 in the mains of motor A, by the aid of a circuit controller 12. In order to obtain position synchronization should such synchronization be necessary, the circuit controller 12 is opened so as to slow down the slave motor A until a point of synchronization is reached; and then the switch 12 is closed.

Figure 4:
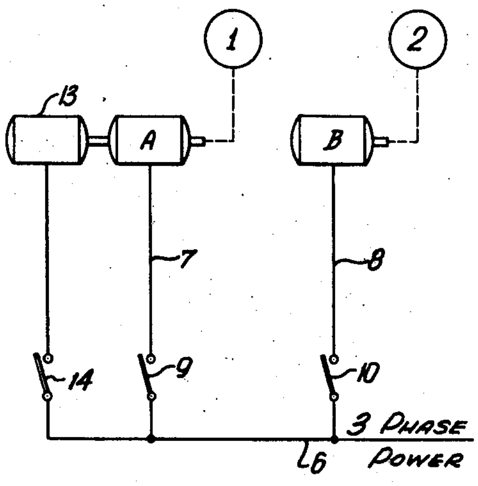

In the form of the system shown in FIG. 4, the circuit controllers 9 and 10 control the power to the slave motor A and the master motor B. The slave motor A is directly coupled to an asynchronous motor, such as induction motor 13, and which is controlled by a circuit controller 14. Normally the circuit controllers 9 and 10 are closed, and the circuit controller 14 is opened. Should a deviation from position synchronization occur, the circuit controller 9 is opened, and the circuit controller 14 is closed, causing the induction motor to drive the load 1. The induction motor preferably is of the high-slip type, causing the load 1 to drop back with respect to the load 2. When position synchronization is obtained, the switch 9 is reclosed, and the switch 14 is reopened.

Figure 5:
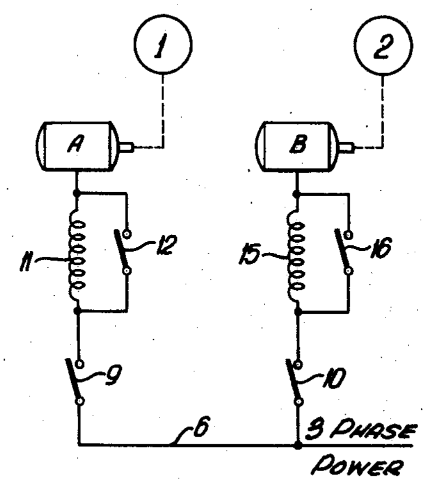

In some instances, it is advisable to make it possible to correct for position synchronization by a choice of controlling either motor A or motor B. The slow-down of one of the motors A or B may be accomplished, as indicated in FIG. 5, by any of the methods illustrated in the previous systems of FIGS. 2, 3 and 4. The system illustrated as an example is that of FIG. 3, in which reactors 11 and 15 in the motor circuits are respectively capable of being optionally open-circuited by the circuit controllers 12 and 16.

Thus, in starting the system, circuit controllers 9, 10, 12 and 16 are closed. If there be a deviation beyond tolerable limits, one or the other of the circuit controllers 12 and 16 is opened, until synchronism is restored. The choice between the two alternatives is determined by the direction in which deviation has occurred. Thus, if load 1 is lagging, then motor B is controlled so as to drop back into position synchronization. Similarly, if load 2 is lagging, motor A is caused to drop back. In such a system, therefore, it may be assured that specific synchronized pairs of points, such as *3a*, *3b* of FIG. 1, may be maintained in registry, rather than to provide for registry between a point of one load with any other point of the other load.

Figure 6:
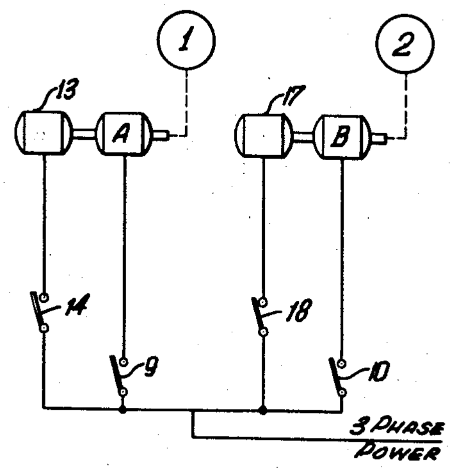

In the form shown in FIG. 6, the slave motor A and the master motor B are coupled respectively to the induction motor 13 and the induction motor 17. The system is quite comparable to that shown in FIG. 4, except that either of the motors A or B may be dropped back by opening the respective circuit controller 9 or 10. The switches 14 and 18 are intended to be closed while this correction is being effected.

Figure 7:
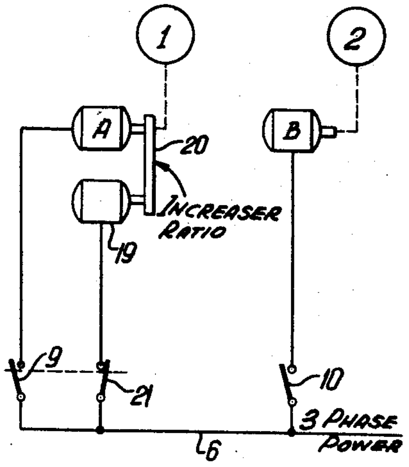

In the system shown in FIG. 7, the system is such that the slave motor A is speeded up to re-establish synchronization. For this purpose, use is made of an induction motor 19, coupled to the slave motor A by the aid of a transmission mechanism 20 that causes the synchronous motor shaft to speed above synchronization.

Thus, when starting the system, the switches 9 and 10 are closed and switch 21 is opened. The switches 9 and 21 are so connected that only one of them may be closed and the other opened.

Upon starting the system into operation, both the slave and master motors A and B are energized, and if there should be a lack of synchronism after both motors are started, the switch 9 is opened and switch 21 is closed. This causes the motor A to be speeded up until synchronism is attained. Then the system is returned to normal operating position by closing switch 9 and opening switch 21.

Figure 8:
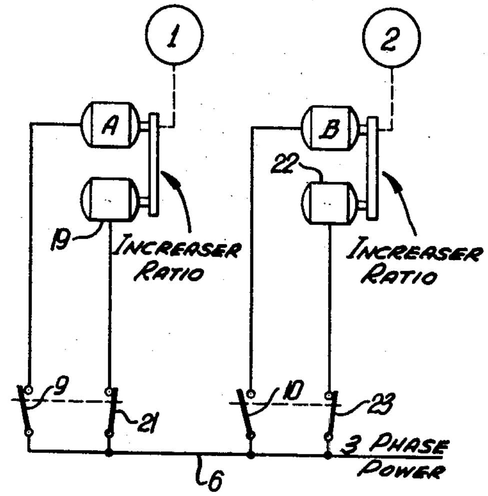

In the system shown in FIG. 8, both slave motor A and master motor B are equipped with induction motor drives 19 and 22. When starting, the circuit controllers 9 and 10 are closed, bringing both machines up to synchronous speed. If position synchronization is satisfied, no further action need be taken. If load 1 is lagging, the circuit controller 9 will be opened and circuit controller 21 will be closed, energizing the induction motor 19 and causing it to run at a speed higher than the synchronous speed of load 2, until the point of synchronization is reached. At this time, the circuit controller 21 is opened and circuit controller 9 is reclosed. On the other hand, if the load 2 is lagging, the same operation can be effected to cause load 2 temporarily to run at a slightly higher speed than load 1.

Figure 9:
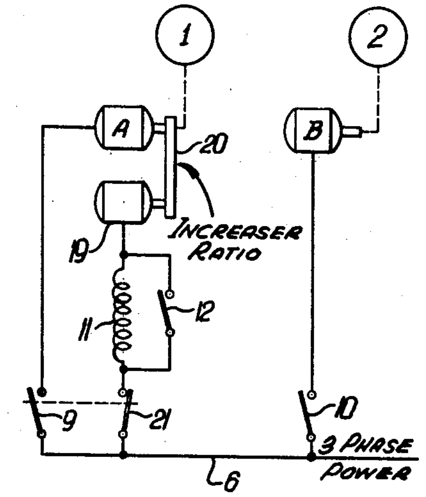

In the form shown in FIG. 9, the slave motor A is so arranged that it can either drop back or speed up. Thus, induction motor 19 is coupled to the load 1 by the aid of the increaser ratio transmission mechanism 20, and circuit controller 12 is arranged to short circuit reactor 11.

In starting the system, the circuit controllers 9, 10 and 12 are closed and circuit controller 21 is opened, causing the motors A and B to attain synchronous speed. If, however, position synchronization is not attained because of a lag in motor A, switches 12 and 21 are closed and switch 9 is opened, causing the induction motor 19 to speed up the load 1. On the other hand, if motor A is leading motor B, switches 9 and 12 are opened so as to drop back the load 1.

Figure 10:
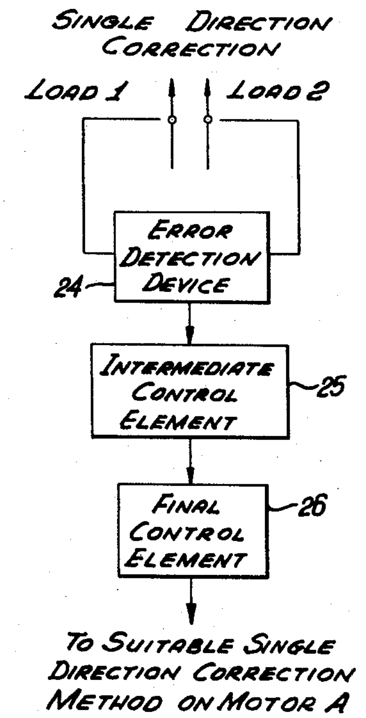
FIGS. 10 and 11 are diagrammatic representations of automatic means for attaining and maintaining position synchronization.

FIG. 10 illustrates how the correction system may be operated automatically. Thus, there is provided an error detection device 24, sensing deviation beyond the tolerable value of position synchronization. This error detection device activates an intermediate control element 25, which in turn causes operation of a final control element 26 which operates upon the motor A in any of the forms illustrated hereinabove in FIGS. 2, 3, 4, 7 and 9.

Figure 11:
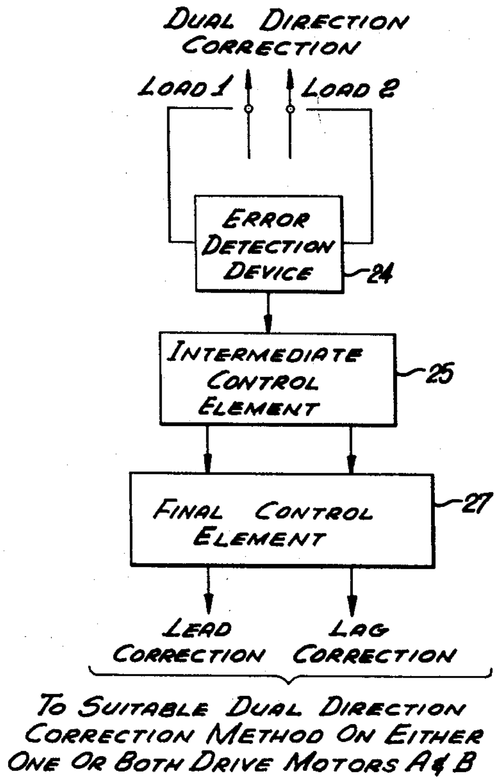

In the diagram illustrated in FIG. 11, the intermediate control operates either of two final control elements 27, and the proper one of the drive motors A and B, as diagrammatically illustrated in FIGS. 5, 6 and 8.

Figure 12:
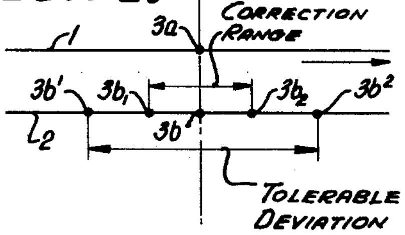
FIG. 12 is a diagram illustrating a tolerable deviation from position synchronization, as well as the effect of the correction of deviation when it exceeds a tolerable value.

FIG. 12 illustrates diagrammatically the correction function of the system. Thus, let us assume that points 3*a* and 3*b* are located on the loads 1 and 2. Due to either a leading or lagging error, the point 3*b* may lag to assume a position $3b^1$, or may lead to assume a corresponding symmetrical position $3b^2$. Let us assume that the spread between points 3*b* and $3b^2$ is tolerable. Within this range of deviation, by appropriate setting of adjustable control elements, no correction may take place.

However, when this range is exceeded, correction is initiated to bring the point 3*b* within the limits of deviation represented by the positions $3b_1$ and $3b_2$.

Accordingly, the correction reduces the deviation to be no greater than the spread represented between these two latter points.

Figure 13:
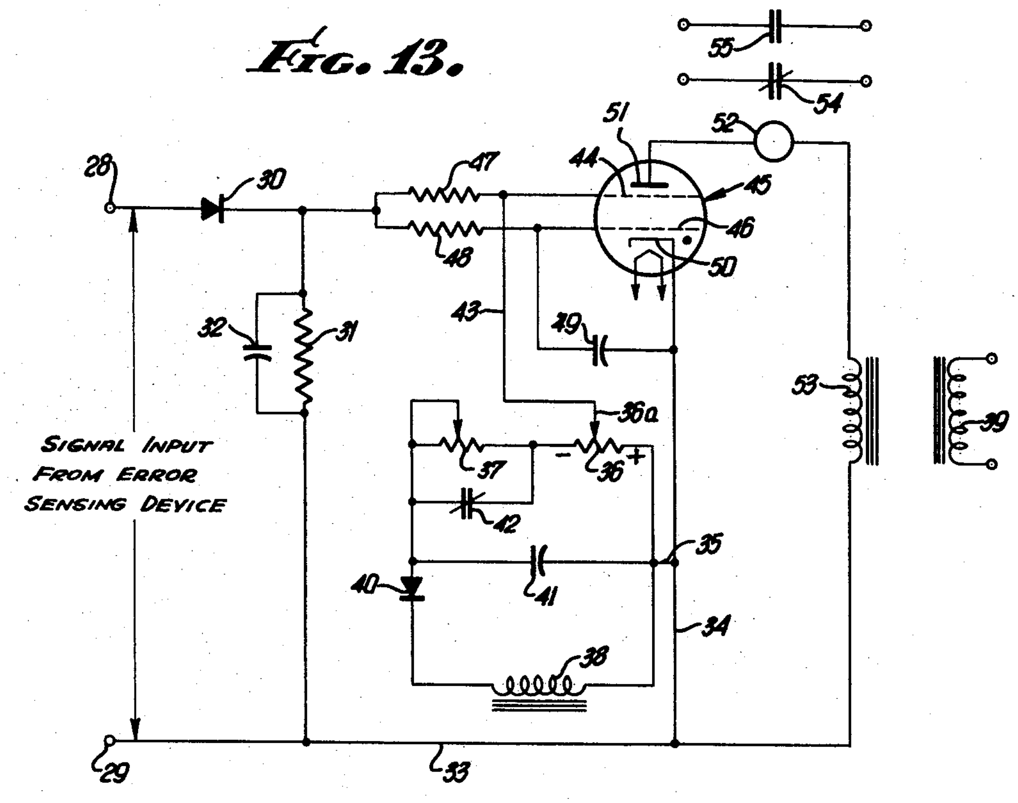
FIG. 13 is a wiring diagram showing one form of a control system interposed between the error detector and the means for correcting the error, in which a thyratron circuit is utilized.

FIG. 13 illustrates the error sensitive system (termed the intermediate control element) of FIGS. 10 and 11. It is assumed that the error signal, in the form of an alternating current voltage, is impressed upon the control system shown in this figure by an error input circuit. This error input circuit is connected to an error sensing device, such as a synchro motor, having two parts respectively affected by the shafts or spindles that are coupled to loads 1 and 2. In a well-understood manner, an alternating current electromotive force is generated by such synchro devices, corresponding to the angular deviation between the two shafts.

The input circuit includes the terminals 28 and 29 coupled to the output of the synchro motor. The electromotive force creates a current flow in one direction only, through a rectifier 30 and a load resistor 31 bridged by a filter condenser 32. The current through the load resistor is always in one direction irrespective of the direction of deviation, due to the interposition of the rectifier 30.

This load resistor is connected by way of a common ground connection 33 and connections 34 and 35 to a potentiometer including the two resistors 36 and 37 in series. Resistor 37 is adjustable and may furthermore be optionally short-circuited by normally closed contacts 42.

The potentiometer resistances 36 and 37 are connected across the terminals of a secondary transformer winding 38 which has a relatively low output potential, such as eleven volts. The primary winding, supplying energy to the secondary 38, is represented by the winding 39 placed in the right-hand portion of the figure in order not to complicate the diagram. The primary winding 39 is connected to the alternating current source of power that supplies the synchro motor.

By virtue of rectifier 40 in series with secondary 38, the direction of current flow due to the transformer secondary winding 38 through the resistors 36 and 37 is such that the potential decreases from resistor 36 through resistor 37. This direction would make the right-hand terminal of resistor 36 positive with respect to the left-hand terminal. Of course, these potentials are considered as those due solely to the transformer winding 38.

Contacts 42 are normally closed during normal operation of the system, that is, when no correction is required.

The half-waves of current pass from the terminal 28 of the deviation sensing device, through the rectifier 30, through resistor 47, connection 43, to an adjustable tap 36*a*, a part of the potentiometer resistance 36, connections 35, 34 and 33 to the other terminal 29 of the sensing device. The control grid 46 of a thyratron 45 connects to the positive side of rectifier 30, via resistor 48 and is biased by aid of the resistor 47, connection 43, and tap 36*a*. The screen grid 44 is connected to the rectifier 30 via resistor 47. A bypass or filter condenser 49 is connected across the control grid 46 and the heated cathode member 50 of the thyratron 45.

The control grid circuit thus includes the connection 35 to the cathode 50; and therefore, the bias on grid 46 is negative by a degree corresponding to the position of tap 36*a*.

If there is no signal current through the rectifier 30, the bias on the screen grid 44 remains negative and corresponds to the potential of the error and bias potential of the tap 36*a* of the potentiometer 36. This bias is determined by the potential of the rectified electromotive force passing through the resistor 36 from the transformer secondary winding 38. Under such circumstances, the bias is sufficiently negative to keep thyratron 45 inactive.

As soon as current flows through the deviation sensitive circuit through the load resistor 31 due to a need for correction, this current would produce a drop across the adjusted resistor 36 that opposes the potential difference across this resistor due to the current from the transformer secondary winding 38. When the deviation is sufficient, this drop causes the grid 46 to become sufficiently positive to fire the thyratron 45, and the thyratron continues to send a current through an output circuit, to be hereinafter described, between the cathode 50 and the anode 51. The thyratron 45 continues to fire until the potential of the control grids 44 and 46 is reduced because of a sufficient reduction in the deviation current.

While the contacts 42 are closed, the grid bias due to the electromotive force across the secondary winding 38 is quite large. Accordingly, a relatively larger error current is necessary to overcome this bias and to cause the thyratron 45 to fire. This is represented by the spread of the points $3b^1$ and $3b^2$ shown in FIG. 12.

As soon as the thyratron 45 fires, the relay coil 52 is energized through the secondary winding 53 coupled to the primary winding 39. The energization of the relay 52 causes contact 42 to open. This reduces the bias between the right-hand terminal of the resistor 36 and the tap 36*a* since now the resistance between these two points is proportionately less in connection with the total resistance of the potentiometer. Accordingly, the thyratron 45 will continue to fire until the deviation from correct position synchronization reaches a relatively low value; that is, as represented by the points $3b_1$ and $3b_2$ in FIG. 12.

The relay 52, when energized, causes opening of normally closed contacts 54 and causes closing of the normally open contacts 55. These contacts 54 and 55 are used, as hereinafter described, to initiate operation of any of the corrective methods illustrated in FIGS. 2 to 9, inclusive.

The thyratron 45 is of the type known as GL–502A. The grid current limiting resistors 47 and 48 are about 65,000 and 33,000 ohms, respectively. The load resistor 31 may be about 51,000 ohms.

Figure 14:
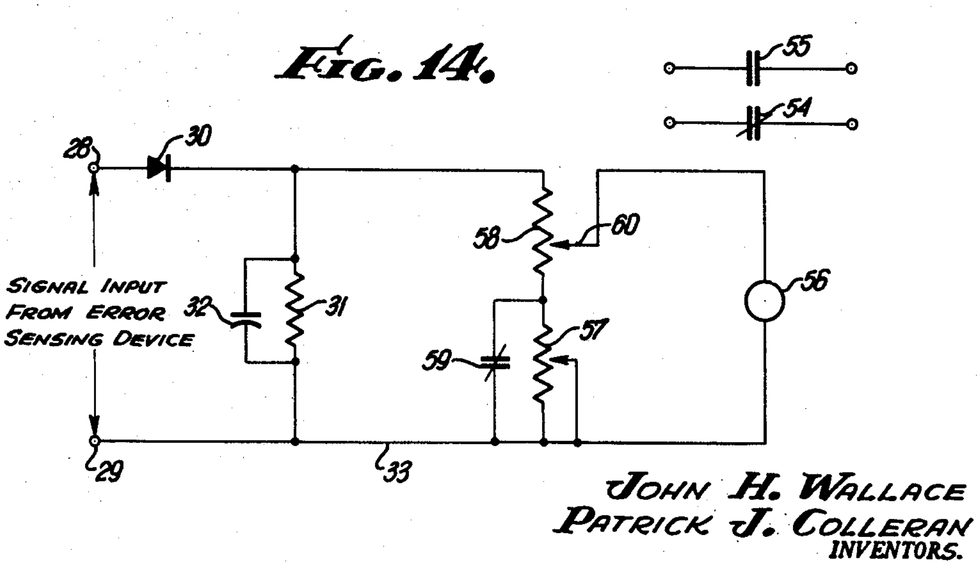
FIG. 14 is a diagram, similar to FIG. 13, of a simplified form of control utilizing a sensitive relay.

A simpler intermediate control system is illustrated in FIG. 14. In this system, the relay coil 56 operates the contacts 54 and 55, as in the form shown in FIG. 13. This relay coil 56 is energized by the aid of potentiometer resistances 57 and 58 in series, fed by the current due to the deviation from position synchronization. The contacts 59 are normally closed while the relay 56 is not energized.

By virtue of an adjustable tap 60, the relay coil 56 can be caused to pull in for any desired predetermined deviation. However, as soon as the relay coil 56 is energized, the contacts 59 open, with the result that the potential drop to the relay coil 56 is proportionately increased. Therefore, the relay 56 will continue to be effectively energized for a lower error in position synchronization, since a reduced deviation current will be necessary to cause relay 56 to drop out.

Figure 16:
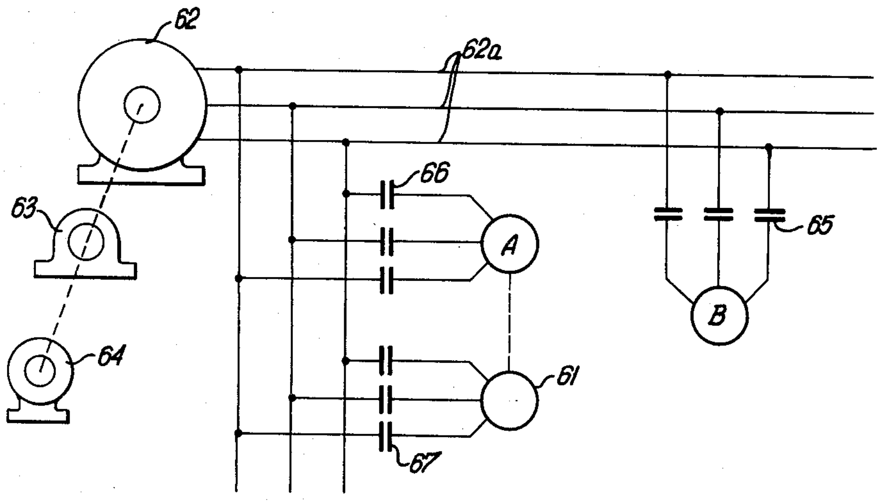
FIG. 16 is a power circuit diagram illustrating the connections for one form of a position synchronized system.

FIG. 16 illustrates the power supply to the master motor B and the slave motor A. In this instance, an induction motor 61 is utilized temporarily to speed up or to slow down the slave motor A, as explained for example in connection with FIG. 7. Other types of controls for causing a slow-down or speed-up of either one or both motors may, of course, be utilized. FIG. 16 represents one example of this type of control.

All of these motors are fed from a common three-phase source, such as an alternator 62.

This alternator is driven at a variable speed by the aid of a variable ratio speed transmission mechanism 63 operated by a motor 64, such as an induction motor fed from appropriate mains.

The alternator 62 is preferably provided with forced excitation, either manually or automatically, during the starting periods of motors A, B or 61. An automatic system for accomplishing temporary forcing is described in an application filed in the name of William M. Evans on February 11, 1958, under Serial No. 714,547, and assigned to the same assignee as this present application. Such forced excitation reduces, during the starting period, the current drain on the alternator.

The master motor B is provided with a contactor 65 for connecting it and disconnecting it with respect to the mains 62*a* fed from alternator 62. Similar contactors 66 and 67 are provided for energizing and deenergizing the slave motor A and induction motor 61.

Figure 15:
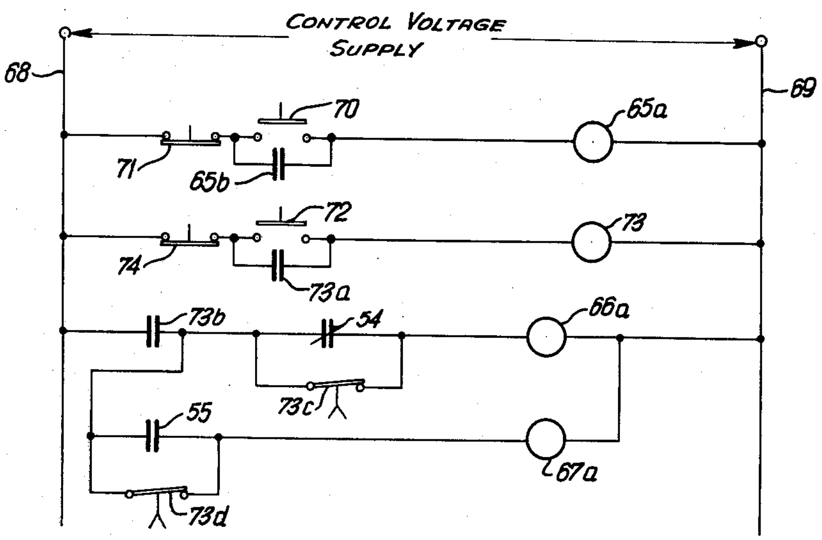
FIG. 15 illustrates a control circuit affected by the system of FIGS. 13 or 14.

FIG. 15 illustrates how the energization of these motors A and B may be accomplished from a standstill position; or alternatively, from a position in which master motor B is operating and slave motor A is at a standstill.

The voltage supply for the control circuits is represented by mains 68 and 69.

Assuming first that the system is at a standstill and that it is desired to initiate the operation of the position synchronized loads 1 and 2, a start button 70 completes a circuit through a contactor electromagnet 65*a*. When energized, the electromagnet causes closing of the contactor 65 of FIG. 16. As soon as the start button 70 is depressed, holding contacts 65*b*, operated by electromagnet 65*a*, keeps electromagnet 65*a* energized to maintain the supply of energy to the master motor B, until the stop button 71 is operated.

When it is desired to start the slave motor A, start button 72 is depressed, energizing a relay coil 73. This relay coil, when energized, immediately closes contact 73*a*, thus providing energization of this relay circuit after the start button 72 is released. This energization continues until the stop button 74 is operated.

The relay coil 73 operates three other sets of contacts or circuit controllers. One of them, 73*b*, closes just as soon as the electromagnet 73 is energized. In addition, there are two time-delay circuit controllers 73*c* and 73*d* which are normally closed but which open only after a time delay upon energization of the electromagnet 73.

Under such circumstances, the electromagnet 66*a* for contactor 66 is energized through the contacts 73*b* and through contacts 73*c*. The slave motor A is thus started.

During the starting period, the motors A and B may keep in step so that no synchronization correction is necessary. Under such circumstances, the contact 54, operated by the correcting relay 52 of FIG. 13, remains closed; and even after the time-delay contacts 73*c* open, the motor A remains energized.

However, should there be an intolerable deviation from position synchronization after the motors are brought up to speed, contacts 54 and 55 are operated. Contact 54 opens and contact 55 closes. This deenergizes slave motor A and causes energization of the induction motor 61 through the contactor electromagnet 67*a*. This continues until the deviation is brought within narrow limits, at which time the relay 52 (FIG. 13) is deenergized, closing the contacts 54 and opening contacts 55.

In order to render the induction motor 61 ready to take over the correcting function, the induction motor 61 is energized temporarily through the time-delay contacts 73*d*.

Once having been drawn into position synchronization, deviation for any cause from position synchronization causes opening of contacts 54 and closing of contacts 55, with the attendant corrective operation of the induction motor 61.

If master motor B is in full operation before motor A is to be started, then the start button 72 is pressed; the motors A and 61 are energized as above explained. The slave motor A is brought to synchronous speed. If position synchronization is effective at that time, contacts 54 remain closed, and contacts 55 remain open; and the induction motor 61 remains unenergized. However, if correction is necessary, the motor A is deenergized at opening of contacts 54, and motor 61 is energized at closing of contacts 55 until position synchronization is effected.

The inventors claim:

1. In a system for maintaining position synchronization of two substantially synchronized moving loads driven by separate electric motors fed from a common source, the combination therewith of means for detecting deviations from said synchronization; control means fed from said detecting means; said control means being so arranged as to respond to deviations beyond a tolerable value; motor means connected to one of the loads and energizable by the same source, said motor means having a normal speed slightly different from that of said one of the motors; and means for temporarily deenergizing said one of the motors and energizing said motor means to reduce the deviation substantially below tolerable value.

2. In a system for maintaining position synchronization of two substantially synchronized moving loads driven by separate electric motors fed from a common source, the combination therewith of means for detecting deviations from said synchronization; control means fed from said detecting means; said control means being so arranged as to respond to deviations beyond a tolerable value; a pair of motor means respectively connected to the loads and energizable by the same source, said motor means having a normal speed slightly different from that of said motors; and means temporarily deenergizing either of said motors and energizing its associated motor means to reduce the deviation substantially below tolerable value.

3. In a system for operating two synchronous motors for position synchronization: means for detecting a deviation from correct position synchronization; means for adjusting the speed of one motor above or below its synchronous speed until position synchronization is achieved; means for then returning said motor to synchronous speed; and means for increasing the synchronous pull-in torque of the one motor when the position error is corrected and the motor is being returned to speed synchronization.

4. In a system for maintaining position synchronism of two substantially synchronous moving loads having separate synchronous motors fed from a common alternating current source for driving said loads respectively, said synchronous motors having synchronous speeds determined by the frequency of said source, said system including means detecting deviations from position synchronism for producing an error signal, the combination therewith of: a starting circuit for the motors; control means operated by said error signal when said error signal reaches a predetermined value for causing one of the motors to deviate from synchronism; and means responsive to initiation of operation of the starting circuit for precluding operation of the control means for an initial starting period adequate to permit the motors to approach running speed independently of said error signal.

5. In a system for maintaining position synchronism of two substantially synchronous moving loads having separate synchronous motors fed from a common alternating current source for driving said loads respectively, said synchronous motors having synchronous speeds determined by the frequency of said source, said system including means detecting deviations from position synchronism for producing an error signal, the combination therewith of: starting circuits for the motors; a circuit controller operated by said error signal when said error signal reaches a predetermined value for causing one of the motors to deviate from synchronism; and time delay means responsive to initiation of the operation of the starting circuit for said one motor for precluding operation of the circuit controller during an initial starting period to permit the motors to approach running speed independently of said error signal.

6. In a system for maintaining position synchronism of two substantially synchronous moving loads having separate synchronous motors fed from a common alternating current source for driving said loads respectively, said system including means detecting deviations from synchronism for producing an error signal, the combination therewith of: separate starting circuits for the motors; supplemental motor means for operating the load of one of said motors at a speed deviating slightly from synchronism; a first normally closed circuit controller providing a serial part of the energization circuit for said one motor; a second normally open circuit controller providing a serial part of the energization circuit for said supplemental motor means; means operated by said error signal for moving said first and second circuit controllers to their opposite positions; and time delay means responsive to initiation of the operation of the starting circuit for said one motor for shunting said circuit controllers during an initial starting period to permit the motors to approach running speed independently of said error signal.

7. In a system for maintaining position synchronization of two substantially synchronized moving loads driven by separate synchronous electric motors fed from a common alternating current source, the combination therewith of: means for detecting deviations from said position synchronization and for producing an error signal; control means having alternate states; means dependent upon the control means being in one of its states for causing one of the loads to be operated at a speed differing from synchronism whereby the deviation from position synchronism is reduced; means operated when the error signal reaches a predetermined value corresponding to a certain deviation for switching the control means to its said one state; and means operated when the error signal reaches a second predetermined value corresponding to a substantially lesser deviation for switching the control means to its other state.

8. The combination as set forth in claim 7 together with means for adjusting the said error signal values at which the said control means is switched.

9. In a system for maintaining position synchronism of two substantially synchronized moving loads driven by separate synchronous electric motors fed from a common alternating current source, the combination therewith of: means for detecting deviations from said position synchronism and producing an error signal; a controllable switching device having an on state and an off state; means dependent upon the switching device being in its on state for causing one of the loads to be operated at a speed differing from synchronism whereby the deviation from position synchronism is reduced; a circuit for said device and fed by said error signal, said circuit including biasing means for determining the value of the error signal at which the device is switched to its on state, and means operated as the device is switched to its on state for changing the bias to maintain the device in its on state until the error signal is reduced a substantial amount below that at which the device is switched to its on state.

10. The combination as set forth in claim 9 in which said device is a thyratron and in which said circuit is a control circuit including a pair of adjustable resistors, and in which one of said resistors is shunted by relay means operated when the thyratron is in its on state.

11. The combination as set forth in claim 9 in which said device is a relay that assumes its on state upon adequate energization thereof and in which said circuit is an operating circuit for the relay and including a pair of adjustable resistors, and in which one of said resistors is shunted as the relay is energized.

12. In a system for maintaining position synchronization of two substantially synchronized moving loads driven by separate electric motors fed from a common source, the combination therewith of means for detecting deviations from said synchronization; control means fed from said detecting means; said control means being so arranged as to respond to deviations beyond a tolerable value; impedance means adapted to be serially inserted in the energization circuit of at least one of said motors so as to reduce the pull-out torque thereof; and means operated by said control means for inserting said impedance means in the energization circuit of said one motor to reduce the deviation substantially below a tolerable value.

13. In a system for maintaining position synchronization of two substantially synchronized moving loads driven by separate electric motors fed from a common source, the combination therewith of means for detecting deviations from said synchronization; control means fed from said detecting means; said control means being so arranged as to respond to deviations beyond a tolerable value; a pair of impedance means adapted respectively to be serially inserted in the energization circuit for said motors; and means for selectively inserting one of said impedance means in the corresponding energization circuit for reducing the deviation substantially below a tolerable value.

References Cited in the file of this patent

UNITED STATES PATENTS

| | | |
|---|---|---|
| 1,558,936 | Simons | Oct. 27, 1925 |
| 1,658,660 | Traver | Feb. 7, 1928 |
| 1,963,087 | Hay | June 19, 1934 |
| 2,203,854 | Andersen | June 11, 1940 |
| 2,232,255 | Myles | Feb. 18, 1941 |
| 2,239,101 | Jeffers | Apr. 22, 1941 |
| 2,301,698 | Harz et al. | Nov. 10, 1942 |
| 2,406,853 | Richardsen et al. | Sept. 3, 1946 |
| 2,418,112 | De Rosa | Apr. 1, 1947 |
| 2,449,065 | Freinkel | Sept. 14, 1948 |
| 2,784,361 | Gauger et al. | Mar. 5, 1957 |
| 2,864,040 | Trotsky | Dec. 9, 1958 |
| 3,003,092 | Campbell | Oct. 3, 1961 |